US012610010B2

(12) United States Patent     (10) Patent No.:   US 12,610,010 B2

Michopanou et al.     (45) Date of Patent:    Apr. 21, 2026

(54) METHOD AND A SYSTEM FOR SILENT AND NON-EXPOSING ALERTING OF PREVIOUSLY ABANDONED CALLS

(71) Applicant: ATOS PUBLIC SAFETY LLC, Irving, TX (US)

(72) Inventors: Eirini Michopanou, Athens (GR); Zisis Tsiatsikas, Ano Toumpa (GR); Minas Botsis, Likovrisi (GR)

(73) Assignee: ATOS PUBLIC SAFETY LLC, Irving, TX (US)

( * ) Notice: Subject to any disclaimer, the term of this patent is extended or adjusted under 35 U.S.C. 154(b) by 196 days.

(21) Appl. No.: 18/545,203

(22) Filed: Dec. 19, 2023

(65) Prior Publication Data

US 2024/0205333 A1     Jun. 20, 2024

(51) Int. Cl.
    *H04M 3/51*      (2006.01)
    *H04M 3/523*     (2006.01)

(52) U.S. Cl.
    CPC ....... *H04M 3/5116* (2013.01); *H04M 3/5231* (2013.01)

(58) Field of Classification Search
    None
    See application file for complete search history.

(56) References Cited

U.S. PATENT DOCUMENTS

| | | | |
|---|---|---|---|
| 2003/0129977 A1* | 7/2003 | Dolwin | H04W 4/90 |
| | | | 455/567 |
| 2008/0101553 A1* | 5/2008 | Goldman | H04M 3/5116 |
| | | | 379/45 |
| 2011/0106449 A1* | 5/2011 | Chowdhary | G01C 21/005 |
| | | | 701/472 |
| 2016/0373578 A1 | 12/2016 | Klaban | |
| 2022/0191671 A1* | 6/2022 | Ekl | H04W 4/021 |
| 2022/0201547 A1* | 6/2022 | Gupta | H04W 4/90 |

FOREIGN PATENT DOCUMENTS

| | | |
|---|---|---|
| KR | 20220032662 A | 3/2022 |
| WO | 2021040824 A1 | 3/2021 |

OTHER PUBLICATIONS

European Search Report for corresponding EP Application No. 22214698, dated Jun. 3, 2023.

* cited by examiner

*Primary Examiner* — Hemant S Patel
(74) *Attorney, Agent, or Firm* — Meagher, Emanuel, Laks, Goldberg & Liao, LLP

(57) ABSTRACT

The present invention relates to a method and a system for silent and non-exposing alerting of previously abandoned calls. The method and the system are configured in a smart way to handle callbacks in in emergency systems such as Next Generation NG9-1-1 or NG1-1-2 systems with the main focus to avoid exposing people in trouble to a dangerous situation.

15 Claims, 2 Drawing Sheets

METHOD AND A SYSTEM FOR SILENT AND NON-EXPOSING ALERTING OF PREVIOUSLY ABANDONED CALLS

The present invention relates to a method and a system for silent and non-exposing alerting of previously abandoned calls. The method and the system are configured in a smart way to handle callbacks in emergency systems such as Next Generation NG9-1-1 or NG1-1-2 systems with the main focus to avoid exposing people in trouble to a dangerous situation.

It is a fact that emergency services call centers receive thousands of accidental and abandoned calls every year. The main problem is that dispatchers may not be able to distinguish between a real emergency and the actual situation at hand. Calling back and alerting the caller may cause trouble, exposing the caller in greater danger, e.g. if the emergency caller is trying to hide from an attacker (spree killer, terrorist, robber, etc.). On the other hand, ignoring the call may also be very risky for caller's safety, e.g. if the emergency caller loses consciousness because of severe injuries or the like.

A modern emergency services call center like a Public Service Answering Point (PSAP) should be able to rapidly collect data, analyze it and suggest a conclusion giving safe options to the dispatcher or even act automatically to ensure that an abandoned call is being resolved without exposing the caller in danger, and eventually sending assistance accordingly.

The collected data would be adequate to indicate situations including an unconscious victim and suggest, for example, whether this has happened after a sudden drop resulting in a significant height/altitude difference. On the other hand, collecting data for the device of interest and possible nearby devices would be valuable to analyze and conclude whether a potential victim is hiding, is in danger or could be contacted to provide information regarding a potential incident, or after all verify, if the abandoned call was a false alarm at the first place.

Therefore, the present invention is based on the object to provide a method and a corresponding system for silent and non-exposing alerting of previously abandoned calls. In particular, a method and a system allowing an emergency services call center to respond to an abandoned call and send assistance in the most optimum way without exposing a victim's position.

This object is solved by a method having the features according to claim 1 and a system having the features of claim 12. Preferred embodiments of the invention are defined in the respective dependent claims.

According to the invention, a method for silent and non-exposing alerting of previously abandoned calls is provided, the method comprises the steps retrieving, by an emergency system unit, signal data for an abandoned call device from a carrier within k seconds; verifying, by the emergency system unit, if the abandoned call device is moving; marking, by the emergency system unit, the abandoned call device as a potential victim, in case the abandoned call device is not moving within m seconds; checking, by the emergency system unit, if for the abandoned call device, a difference z, for example 5 m, 10 m, 30 m etc. in altitude is detected and, if yes, ending the method.

In the sense of the present invention, an abandoned call device may be a telephone, smartphone, or a computer where the caller has made an emergency call, but the emergency call has been disconnected, or the connection was so poor that the connection has been terminated. A victim in the sense of the present invention is a person who is unconscious, unable to move, unable to speak, etc.

According to a preferred embodiment, if no difference z in altitude is detected and/or if the abandoned call device is moving within m seconds, the method further comprises checking, by the emergency system unit, if other devices are within a distance of x meters to the abandoned call device; sending, by the emergency system unit, to the abandoned call device an alert, if no other devices are within a distance of x meters to the abandoned device; and ending the method.

According to another preferred embodiment, if other devices are within a distance of x meters to the abandoned call device, the method further comprises checking, by the emergency system unit, if all of the other devices are moving; sending, by the emergency system unit, to the abandoned call device an alert, if all of the other devices are moving; and ending the method.

According to still another preferred embodiment, if not all of the other devices are moving, the method further comprises calculating, by the emergency system unit, a distance d between the abandoned call device and the other moving devices; checking, by the emergency system unit, if the distance d is in a range large enough, wherein it is possible to adjust the volume of the alarm of the abandoned call device; sending an alert, by the emergency system unit, to the abandoned call device if the distance d is large enough; and ending the method.

Further, according to a preferred embodiment, if not all of the other devices are moving, the method further comprises sending, by the emergency system unit, to the abandoned call device a silent alert in case the distance d is not in a range large enough, wherein it is possible to adjust the volume of the alarm of the abandoned call device; then ending the method.

According to yet another preferred embodiment, the signal data of the abandoned call device and/or the other devices comprising sets of three-dimensional position coordinates (x, y, z) for a time period tn.

According to yet another preferred embodiment the time period tn is $\leq 30$ seconds, preferably $\leq 20$ seconds, more preferably $\leq 10$ seconds. Or wherein the time period tn is a range of 5 to 60 seconds, preferably of a range of 10 to 45 seconds, more preferably of a range of 15 to 30 seconds.

According to yet another preferred embodiment, the difference t in three-dimensional position coordinates (x, y, z) of the abandoned call device and/or of the other devices for different time periods tn and tn+1 is calculated as $x_{tn+1}-x_{tn}$, $y_{tn+1}-y_{tn}$, $z_{tn+1}-z_{tn}$.

According to yet another preferred embodiment, the distance x in meters is $\leq 800$ meters, preferably $\leq 500$ meters, more preferably $\leq 200$ meters. However, the distance range depends on the surrounding of the device of interest. For example, in a building or a hilly environment, the distance is less than on a flat field without sound barriers and backgrounds.

According to yet another preferred embodiment, the emergency system unit is part of an Emergency Service Routing Proxy, ESRP, part of a Public Safety Answering Point, PSAP, or is a software application running on a computer or server of an emergency network or is connected to a computer or a server of an emergency network, an ESRP or a PSAP.

According to yet another preferred embodiment, the emergency system unit checks if the distance d is large enough that the volume of the alarm of the abandoned call device is adjusted to be approximately $\leq 35$ dB, preferably $\leq 30$ dB, more preferably $\leq 25$ dB.

According to yet another aspect of the present invention, a system for silent and non-exposing alerting of previously abandoned calls is provided, wherein the system is configured to perform the steps of the method.

According to yet another preferred embodiment, the system comprises an emergency system unit to perform most of the method steps, wherein the emergency system unit further comprising a storage to store signal data; a network carrier to provide signal data from devices within the network; and an abandoned call device.

According to yet another preferred embodiment, the emergency system unit is part of an Emergency Service Routing Proxy, ESRP, part of a Public Safety Answering Point, PSAP, or is a software application running on a computer or server of an emergency network or is connected to a computer or a server of an emergency network, an ESRP or a PSAP.

According to yet another aspect of the present invention, a program element is provided, which when being executed by a processor is adapted to carry out steps of the present method.

According to a preferred embodiment, the difference in the predetermined altitude is evaluated by the emergency service, using the difference in the coordinates $z_n - z_{n-1}$ within the time period tn.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed. The invention and embodiments thereof will be described below in further detail in connection with the drawing(s).

Figure 1:
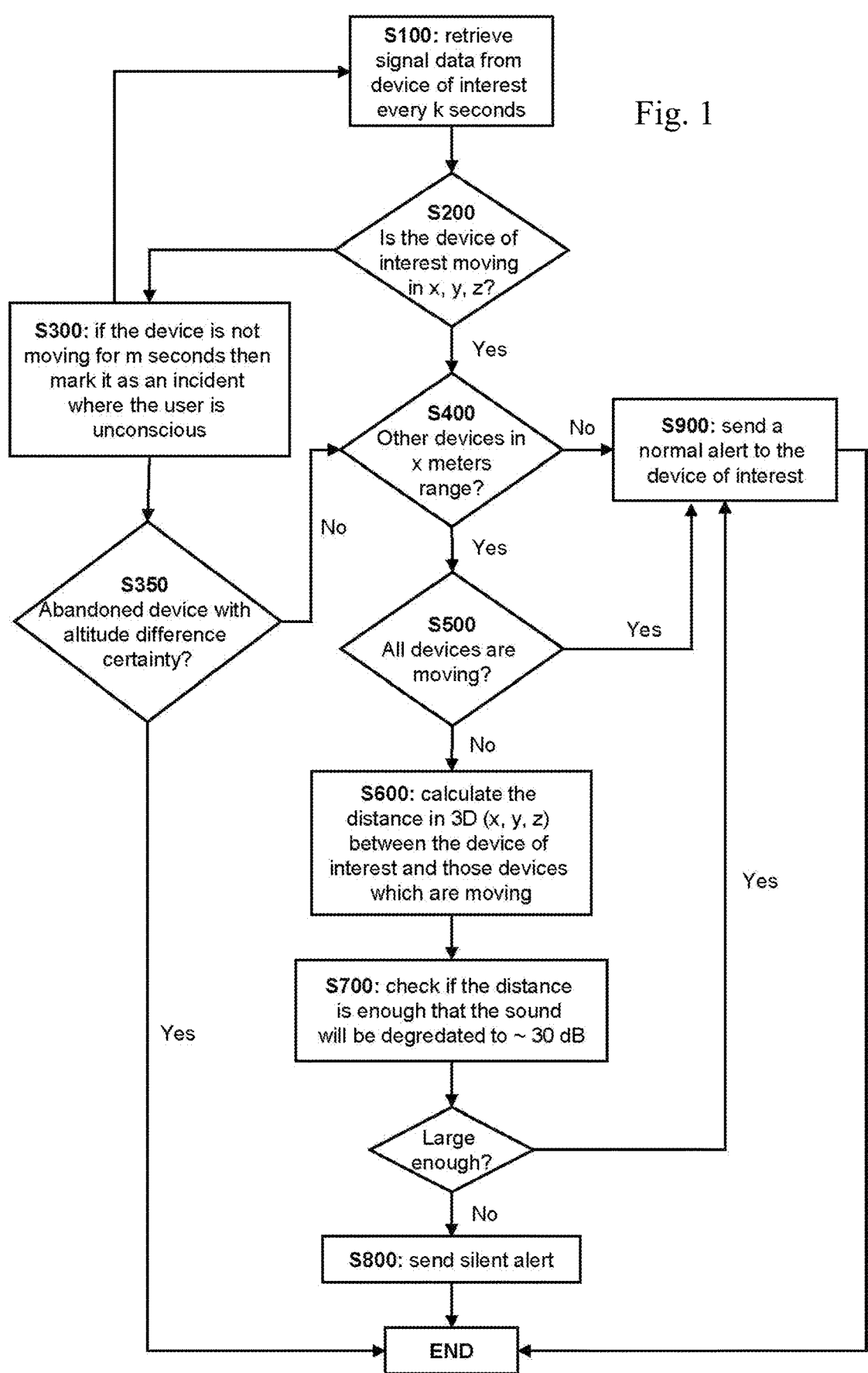
FIG. 1 shows a flowchart of steps of the method for silent and non-exposing alerting of previously abandoned calls according to an embodiment of the invention.

FIG. 1 shows a flowchart of steps of the method according to an embodiment of the invention. It is assumed that the proposed method is executed continuously in the background of an emergency system, for example, in a specific unit such as an emergency call center, an Emergency Service Routing Proxy (ESRP), a Public Safety Answering Point (PSAP) or other parts of an emergency system. In a first step S100, an emergency system unit which is executing the present method retrieves signal data from a network provider or carrier for a device of interest every k seconds. The retrieved signal data is also referred to as data in the present application. Generally, an emergency system has the authority to retrieve data on specific devices of interest or to request data signals from such devices from a provider or carrier. In the sense of the invention, a device of interest is, for example, a mobile device like a smartphone, a smartwatch or else from which a call was made or from which a call has been attempted to the emergency call service, but for various reasons it could not be answered directly by the service personnel of the emergency call center. Such a call or call attempt is referred to as an abandoned call. Furthermore, abandoned calls are also those where the connection could be established during a call with an employee, an Interactive Voice Response (IVR) or an artificial intelligence (AI) of the emergency call center, but could not be completed satisfactorily, for whatever reason. In the sense of the invention, devices which made an abandoned call are also referred to as abandoned call devices. Whereby, the retrieved signal data is preferably in the form of three-dimensional (3D) coordinates (x, y, z) and is therefore also called position data in the sense of the invention.

Next, in the step S200, the emergency system unit evaluates whether the device of interest is moving based on the timing of the retrieved position data. It is assumed that the provider or carrier permanently analyzes or at least sends the signal data of each device permanently, thus it is possible to determine the location coordinates of each device based on the latest and future mobile communication standards. To determine if a device of interest or abandoned call device is moving, collected sets of different position data of different time periods tn or tn+1 ($z_{tn}$, $y_{tn}$, $x_{tn}$; $z_{tn+1}$, $y_{tn+1}$, $x_{tn+1}$, etc.) is computed by simply subtracting these different coordinates as follows: $x_{tn+1} - x_{tn}$, $y_{tn+1} - y_{tn}$, $z_{tn+1} - z_{tn}$, etc.

If there is no difference in the position signal data for a time span of m seconds, it is assumed that the device of interest is not moving, therefore the device is then marked in step S300 as belonging to a potential victim that may be unconscious (aspect 1).

Then, in a next step S350, it is evaluated if there is major difference in elevation, i.e., in coordinate z or altitude of the position data. In case a very high difference in a short time is recognized, it is concluded that the device in question may have been dropped. However, it is also possible that the user of the device is still with the device, thus the user may have fallen and is now unconscious and needs help (aspect 2). Thus, in such cases, the method ends because there is no meaning to alert such a device either silently or not. In order to exclude the case that the z parameter changes because the victim is hiding, it is assumed that most of the times, the mobile device is laying on the ground for an unconscious victim, and thus, after the change in z, if the device is less than g cm from the ground, e.g. 20 cm. In this case, the proposed method monitors the victim location data for other actions, for the next r seconds, e.g. 45 seconds. However, as an option, geographic data or maps could be used to determine the surroundings or the terrain of the last position of the device of interest in order to determine whether there are high-rise buildings, mountains or simply a slope in the vicinity that could make a fall or something similar plausible. If this should be the case, emergency personnel could be dispatched there.

Otherwise, if the device of interest is considered to move since there was a difference in the position data sets, it is checked if there are other devices in the vicinity of the device of interest (see step S400). This is done based on further signal data from other devices that are in the vicinity of the latest position of the device in question. The further signal data of the other devices is retrieved again from the network providers or carriers. The vicinity can be defined as a range of x meters or as a radius of x meters, where x can depend on parameters of the current emergency incident such as type, location (terrain or environment), etc.

In case other devices do not exist or all the devices are moving in step S500, based on the position data, which is retrieved from the network provider, then in step S900, a normal alert to the user of the device of interest is send by an emergency service because in this case it does not make sense to send a silent alert and the method is terminated.

However, in case some of the other devices in the area do not move, then this is a strong indication that the static devices correspond to people which try to hide from danger. Following this assumption, in step S600, the emergency system unit calculates the distance between the monitored device of interest and the other devices which are moving.

Then, in step S700, it is checked if the distance between the device of interest and the other moving devices that are detected is large enough so that the sound level of the device of interest will be received as a 25 db-35 db sound (i.e., whisper) by the devices which are moving even if the devices are at the maximum volume (~100 db). This calculation is based on the inverse square law which states that the sound is reduced by 6 db every time the distance from the sound source is doubled. So, the point in this part of the method is concentrated on calculating the necessary distance so that a normal alert that will arrive on the monitored device will be heard as a whisper to the other devices which are moving, and which are considered to be dangerous. Thus, on the one hand, there is a chance that the dangerous devices will not perceive the sound at all, on the other hand, even if the sound is heard, it will not be sure where exactly it came from, meaning which is the precise position of the hidden devices.

In the case the distance is large enough, then the method performs step S900 and sends a normal alert to the user of the monitored device. According to the calculations this will be perceived from the moving devices, in the worst case, as a whisper, or even a similar lower sound. However, in case the distance is not large enough, or if there are suspicions that the mobile device is infected from a malicious software, then in step S800, a silent alert is sent to the device of interest. In case the device was infected by a malicious software, the latter could alter malevolently the sound level of the device, with the aim to expose the hidden victims.

Concerning the clarification regarding the device of interest as one of a victim's device, it is assumed that the devices which are not moving are usually the hidden ones and their holders correspond to the victims. It is possible to further use swarm analytics from the prior art in order to identify which people are in danger based on their location data and so forth. Another approach is to consider that a device which is moving below x meters per k seconds, is considered as a victim's device. So, maybe such devices correspond to victims which try to change their position when they feel safe, but these changes are very slow and rare. For example, if a device A is moving only 2 meters every 20 minutes, while other devices are moving more often with only a few meters of difference between these devices, then it is assumed that device A belongs to a victim.

Figure 2:
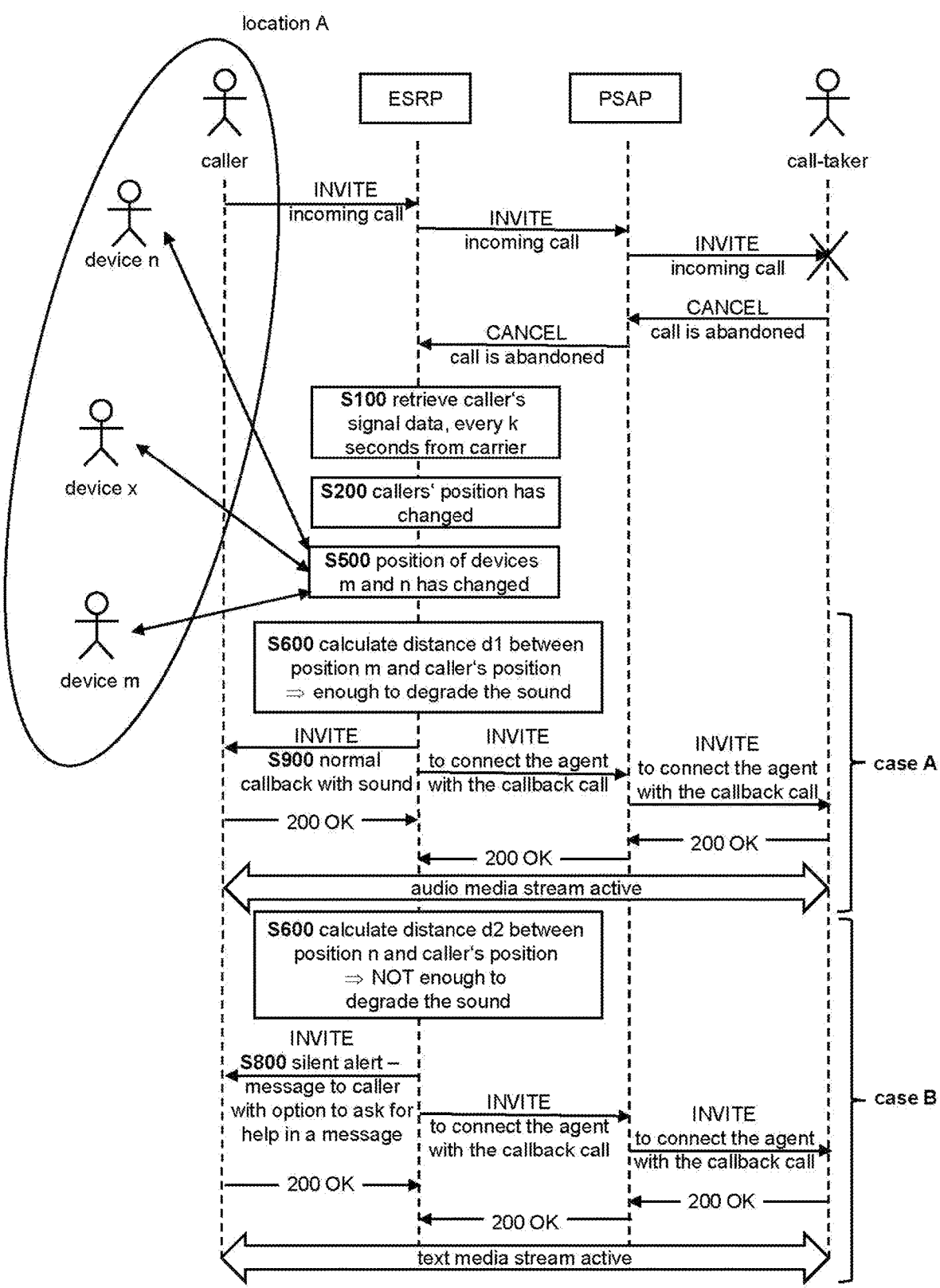
FIG. 2 shows a schematic illustration of use cases of the method for silent and non-exposing alerting of previously abandoned calls according to another embodiment of the invention.

FIG. 2 schematically shows an illustration of use cases of the method for silent and non-exposing alerting of previously abandoned calls according to another embodiment of the invention. Out of the location A, a caller makes an emergency call which is routed to an ESRP of an emergency system. The call is forwarded (routed) to a responsible PSAP, however, the caller releases the call before it was answered. The ESRP recognizes this call now as an abandoned call and triggers the inventive method.

In step S100, the ESRP retrieves from a network carrier or provider position data for the abandoned call device every 10 seconds (configurable). In a next step S200, the ESRP checks if the position of the abandoned call device has changed over a predefined time span by calculating the difference between the current and the initial devices position (x1, y1, z1). If this difference is 0, it is derived that the caller is not moving. In the next steps (not shown in FIG. 2), the ESRP checks for other near-by devices. In the present embodiment the devices x, m and n are found. Position data for each of these devices is retrieved from network carriers. In step S500, it is checked if these devices are moving. In this example, devices m and n were detected as moving devices due to the location difference between initial location and current location of these devices. Device x is located in the position (x2, y2, z2), device m is located in the position (x3, y3, z3) and device n is located in the position (x4, y4, z4). Then the difference between the abandoned call device and each of these devices is calculated. The distance d1 for device m (x3, y3, z3-x1, y1, z1) is >0 and so is distance d2 for device n (x4, y4, z4-x1, y1, z1).

In step S600, the ESRP checks if the distance of the caller and each of the device m and n is large enough to degrade the sound so that an alert is merely or not heard at all (even in worst case, the alert would be heard as a whispering sound in about 25 dB). If the distance is not large enough, the ESRP retrieves continuously the location data for the moving devices (m, n) and only reacts when the distance vs. the sound requirement is fulfilled and an alert can be sent safely.

For example, in a 1-meter distance, the average sound level is 85 dB, and based on the inverse square row rule, the distance between the device of interest and each of the moving devices (m, n) needs to be calculated in order to conclude if an alert of a callback will be heard in the worst case the abandoned call device is at maximum loudness. The table below gives the relation between the distance of the devices and the sound level.

| Distance in meters between devices | dB |
| --- | --- |
| 1 | 85 |
| 178 | 40 |
| 316 | 35 |
| 562 | 30 |

Further, in FIG. 2, two example cases are depicted. In the first example (case A), the distance d1 between the caller and device m is calculated in step S600. The distance d1 is calculated as 300 meters long. The noise level is calculated to 35 dB and is considered a low-level noise, so the ESRP sends a normal callback call—with sound—to connect the caller and call-taker respectively an agent of the PSAP in step S900. For such a connection, an audio media steam is activated.

In the second example (case B), the distance d2 between the abandoned call device and device n is calculated in step S600. The distance d2 is 30 meters long. The sound is calculated to be 55 dB which is considered risky for the noise to be heard, so the ESRP sends a silent alert in step S800. A silent alert is a message that gives the caller the option to respond with a message that he/she is in danger and needs help. In this case, the ESRP connects the caller of the abandoned call device with a call-taker or agent who will receive the message and can then dispatch appropriate help to the point of the incident. For such a connection a text media steam is activated.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

The invention claimed is:

1. A method for silent and non-exposing alerting of previously abandoned calls, wherein the method comprises:

retrieving, by an emergency system unit, every k seconds, signal data for an abandoned call device from a network carrier, said signal data of the abandoned call device comprising sets of three-dimensional position coordinates (x, y, z) for a time period of k seconds, where $\leq 30$ seconds;

verifying, by the emergency system unit, if the abandoned call device is moving for a predetermined period of time, by subtracting the three-dimensional position coordinates of the abandoned call device from different sets of three-dimensional position coordinates for different time periods each of k seconds, the abandoned call device being not moving if there is no difference in the sets of three-dimensional position coordinates (x, y, z) for the predetermined period of time;

marking, by the emergency system unit, the abandoned call device as a potential victim, in case the abandoned call device is not moving for the predefined period of time;

checking, by the emergency system unit, if for the abandoned call device, a difference z in altitude of at least 5 meters is detected, said difference in altitude being evaluated by subtracting the coordinates $z_{n+1}$-$z_n$ from different sets of three-dimensional position coordinates for different time periods of k seconds; and, if yes, ending the method.

2. The method according to claim 1, wherein, if the abandoned call device is not moving and no difference z in altitude is detected or if the abandoned call device is moving for the predetermined period of time, the method further comprises:

checking, by the emergency system unit, if other devices are within a distance of x meters to the abandoned call device, wherein the distance of x meters is $\leq 800$ meters;

sending, by the emergency system unit, to the abandoned call device an alert, if no other devices are within a distance of x meters to the abandoned call device; and ending the method.

3. The method according to claim 2, wherein if other devices are within the distance of x meters to the abandoned call device, the method further comprises:

checking, by the emergency system unit, if all of the other devices are moving;

sending, by the emergency system unit, to the abandoned call device an alert, if all of the other devices are moving; and ending the method.

4. The method according to claim 3, wherein if not all of the other devices are moving, the method further comprises:

calculating, by the emergency system unit, respective distances between the abandoned call device and all the other devices that are moving;

checking, by the emergency system unit, if the respective distances are in a range large enough so that a volume of an alarm of the abandoned call device is received by all the other devices that are moving as a whisper sound;

sending an alert, by the emergency system unit, to the abandoned call device if the respective distances are in the large enough range; and ending the method.

5. The method according to claim 4, wherein if not all of the other devices are moving, the method further comprises:

sending, by the emergency system unit, to the abandoned call device a silent alert in case the respective distances are not in a range large enough, so that a volume of an alarm of the abandoned call device is received by the other devices as a whisper sound; then, ending the method.

6. The method according to claim 4, wherein in the step of checking, by the emergency system unit, the emergency system unit checks if the respective distances to the other devices are large enough so that the volume of the alarm of the abandoned call device is received by the other devices as a sound of approximately $\leq 35$ dB.

7. The method according to claim 2, wherein signal data of the other devices are retrieved from the network carrier and comprises sets of three-dimensional position coordinates (x, y, z) for a time period of k seconds.

8. The method according to claim 7, wherein calculating a distance between the abandoned call device and the other devices comprises calculating respective differences between position coordinates of the set of three-dimensional position coordinates (x, y, z) of the abandoned call device and each of the other devices for different time periods, each time period being k seconds.

9. The method according to claim 2, wherein a distance x in meters is $\leq 500$ meters.

10. The method according to claim 1, wherein the emergency system unit is part of an Emergency Service Routing Proxy (ESRP), part of a Public Safety Answering Point (PSAP), or is a software application running on a computer or server of an emergency network or is connected to a computer or a server of an emergency network, an ESRP, or a PSAP.

11. A system for silent and non-exposing alerting of previously abandoned calls, wherein the system comprises:

an emergency system unit configured to perform the method steps of claim 1, wherein the emergency system unit further comprises a storage to store signal data for an abandoned call device;

the emergency system unit is configured to retrieve from a network carrier the signal data for the abandoned call device within the network; and the abandoned call device.

12. The system according to claim 11, wherein the emergency system unit is part of an Emergency Service Routing Proxy (ESRP), part of a Public Safety Answering Point (PSAP), or is a software application running on a computer or server of an emergency network or is connected to a computer or a server of an emergency network, an ESRP, or a PSAP.

13. The system according to claim 11, wherein the emergency system unit is configured to retrieve from the network carrier signal data for other devices within the network and the signal data of the devices comprises sets of three-dimensional position coordinates (x, y, z) for a time period of k seconds, wherein the time period k is $\leq 30$ seconds.

14. The system according to claim 13, wherein calculating a distance between the abandoned call device and the other devices comprises calculating respective differences between position coordinates of the set of three-dimensional position coordinates (x, y, z) of the abandoned call device and each of the other devices for different time periods, each time period being k seconds.

15. A non-transitory storage medium comprising a program element, which when being executed by a processor is adapted to carry out the method according to claim 1.

* * * * *